United States Patent [19]

Sandstrom et al.

[11] 4,004,627

[45] Jan. 25, 1977

[54] PNEUMATIC TIRE WITH SIDEWALL COMPOSITION

[75] Inventors: Paul H. Sandstrom, Tallmadge; Joginder Lal, Akron, both of Ohio

[73] Assignee: The Goodyear Tire & Rubber Company, Akron, Ohio

[22] Filed: Dec. 19, 1975

[21] Appl. No.: 642,273

[52] U.S. Cl. .......................... 152/355; 152/353 R; 152/DIG. 12; 156/110 C; 156/116; 260/4 R; 260/5; 260/875; 260/878 R; 260/879; 260/882; 260/885; 260/894; 260/889

[51] Int. Cl.² ................. C08F 15/06; C08G 20/20

[58] Field of Search ........... 260/4 R, 5, 80.78, 875, 260/878, 879, 882, 885, 894; 152/355

[56] References Cited

UNITED STATES PATENTS

| | | | |
|---|---|---|---|
| 3,638,702 | 2/1972 | Eudter | 260/5 X |
| 3,704,741 | 12/1972 | Turk | 260/5 X |
| 3,766,302 | 10/1973 | Holub et al. | 260/884 |
| 3,821,134 | 6/1974 | Son et al. | 260/5 |
| 3,830,274 | 8/1974 | Waser, Jr. | 260/5 X |
| 3,859,263 | 1/1975 | O'Connor | 260/80.78 |
| 3,897,405 | 7/1975 | Son et al. | 260/5 X |

*Primary Examiner*—Murray Tillman
*Assistant Examiner*—T. De Benedictis, Sr.
*Attorney, Agent, or Firm*—F. W. Brunner; H. C. Young, Jr.

[57] ABSTRACT

The invention relates to a pneumatic tire sidewall and to compositions useful therefor. Such elastomeric composition are comprised of a blend of (A) ethylene/propylene/diene terpolymer, (B) rubbery α-olefin interpolymer, (C) high unsaturation rubber comprised of about 30 to about 80 weight percent natural rubber and (D) especially experimentally selected and manipulated compound additives selected from triallyl cyanurate, various maleimides and various anhydrides. The particular elastomeric composition are evaluated to enhance the adhesion of the sidewall to the tire carcass stock.

20 Claims, 3 Drawing Figures

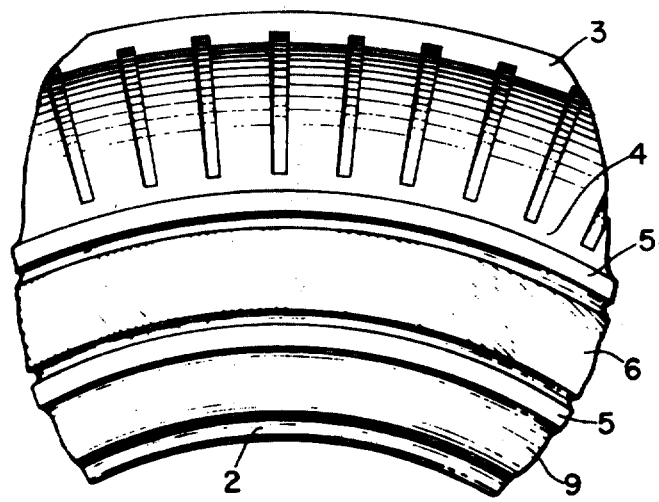
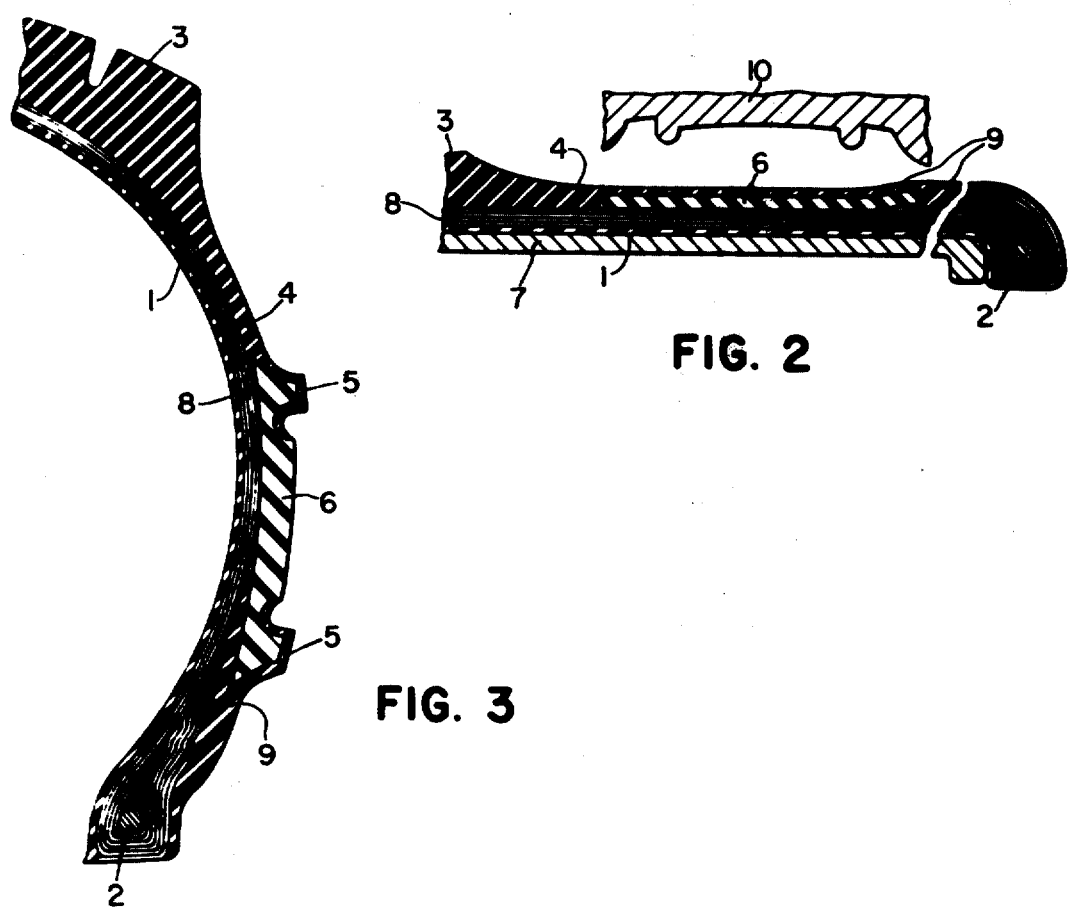
FIG. 1
FIG. 2
FIG. 3

PNEUMATIC TIRE WITH SIDEWALL COMPOSITION

This invention relates to pneumatic tire sidewalls and to compositions useful therefor. The invention particularly relates to tire sidewalls and to corresponding elastomer blends containing adhesion-enhancing additives.

Pneumatic rubber tires are typically prepared with a protective outer sidewall portion, which can consist entirely of a black sidewall or of a white sidewall under a black coverstrip portion which is at least partially buffed away to expose a desired width of the white sidewall. Such sidewalls are subjected to extensive flexing and continual distortion under normal running conditions of the tire under load. Such conditions include temperatures significantly higher than the ambient temperature. Degradation of the sidewall under these conditions is made visible quickly and dramatically by environmental chemical action, flex-cracking and loss of adhesion to the tire carcass. The atmospheric chemical action, such as ozone attack and flex-cracking erode and degrade the sidewall. Adhesion deficiency of the layers of rubber at the elevated operating temperatures can typically result in a separation of the sidewall from the carcass. All these degradative factors promote tire failure hazards.

Therefore, it is an object of this invention to provide a pneumatic tire with a sidewall of a novel rubber composition having improved adhesion to the carcass under degradative operating conditions.

INVENTION

It has now been discovered that sidewalls of a pneumatic tire which are subjected to extensive flexing can be prepared from a suitably cured elastomer blend of a novel combination of elastomers and additive materials. The sidewalls so obtained have enhanced adhesion to tire carcass.

In accordance with this invention, a pneumatic rubber tire is provided comprising a generally toroidal shaped carcass with a circumferential tread, shaped beads and connecting sidewall portion extending between said tread and beads and having adhered to said sidewall portion an outer rubbery sidewall layer extending from the general area of said bead portion towards said tread, where said rubbery sidewall layer is an elastomeric composition comprised essentially of (A) 10–40 phr, preferably 20–35 phr, EPDM, (B) 0–20 phr, preferably 5–15 phr, of a rubbery polymer prepared from a $C_4$–$C_{10}$ α-olefin (or mixtures thereof) interpolymerized together with a $C_5$–$C_{30}$ nonconjugated diene or polyene (or mixtures thereof), (C) 60–80 phr, preferably 65–75 phr, of high unsaturation rubbers comprised of about 30 to about 80 weight percent natural rubber, and (D) about 0.5 to 10 phr, preferably 1 to 5 phr, of at least one compound selected from triallyl cyanurate, mono- and bis-maleimides selected from maleimide, N-ethylmaleimide, N-phenylmaleimide, N-trichlormethylmaleimide, N-4-carboxyphenylmaleimide, N,N'-thiobismaleimide, N,N'-dithiobismaleimide, and N,N'-phenylenebismaleimide, and anhydrides selected from isatoic anhydride, N-methylisatoic anhydride, phthalic anhydride, succinic anhydride, and maleic anhydride.

If the sidewall layer is white or has a color, a coverstrip layer is generally at least partially superimposed on it. After curing, the overlapping coverstrip is customarily buffed to expose a desired width of the white or colored sidewall composition.

The high unsaturation rubbers are those selected from the group consisting of natural high cis-1,4-polyisoprene rubber, synthetic high cis-1,4-polyisoprene, high cis-1,4-polybutadiene, butadiene/styrene rubber or SBR, solution SBR and polyalkenylenes. Natural rubber and SBR are preferred. The total amount of rubbers in the formulation is based on 100 parts by weight. The peel adhesion of the blend composition of this invention to tire carcass stock was found to be unexpectedly higher than that obtained from similar blends without the additive compound. These blend compositions without any added antiozonant in the curing recipe also exhibit excellent ozone resistance under static or dynamic test conditions.

It should be understood by one skilled in the art that said outer sidewall and coverstrip layers can be compounded by methods generally known in rubber compounding, such as by mixing the constituent rubbers in the recipe with various curatives, processing additives, fillers, pigments, antioxidants and antiozonants. They are typically sulfur cured. However, in order to maintain compatibility with the basic pneumatic rubber tire carcass, it is required that the said cured sidewall and coverstrip layers be characterized by having a 300 percent modulus at 25° C. in the range of about 500–1200 pounds per square inch, preferably 600–800 pounds per square inch.

Further objects and advantages of this invention with regard to pneumatic rubber tires will be apparent when the specification is read in conjunction with the accompanying drawings in which:

FIG. 1 is a side elevational view of a pneumatic rubber tire employing this invention, FIG. 2 is a cross-sectional view, with parts broken away, of a green tire layup and a portion of the mold for the tire, and FIG. 3 is a partial cross-sectional view of the molded and cured rubber tire.

Referring to the drawings, the cured rubber tire comprises the usual carcass 1, bead portions, 2, tread portion 3 and connecting sidewall portion 4. One or more scuff ribs 5 may extend circumferentially around the side of the tire to protect an outer colored sidewall layer 6.

More specifically, the tire is typically formed on a building drum 7 with the usual carcass plies 8, bead 2 and tread 3. At least one of the sidewalls 4 includes an outer adherent colored sidewall layer 6 between the ribs 5 other than black, and an adherent coverstrip 9 extending from the bead portion 2 over at least a portion of the said colored sidewall overlay 6. If desired, the coverstrip overlay can be extended to the tread portion 3.

The green tire is then placed in a mold 1 where it is heated and cured to form the cured tire more clearly shown as a cross-sectional view by FIG. 3.

The cured sidewall coverstrip is buffed to remove a portion thereof and expose the colored sidewall overlay 6 as demonstrated in the cross-sectional view of FIG. 3.

Thus, the completed vehicular tire, which typically may be of the bias, bias-belted or radial construction, exhibits a black sidewall or coverstrip layer having improved hot peel adhesion to the tire carcass.

RUBBERY POLYMERS

The rubbery $C_4$–$C_{10}$ α-olefin polymers employed in the practice of the invention are prepared by interpolymerizing 70–98 weight percent of at least one $C_4$–$C_{10}$ α-olefin with 30–2 weight percent of at least one $C_5$–$C_{30}$ nonconjugated polyene containing from 2 to 8, preferably from 2 to 4 carbon to carbon double bonds using a coordination or Ziegler-type catalyst. The inherent viscosities of these rubbery α-olefin polymers can be in the range of about 1 to 10 dl/g, preferably between 2 to 7 dl/g. Representative of such α-olefins are, for example, 1-butene, 1-pentene, 1-hexene, 1-octene, and 1-decene, of which 1-hexene or mixtures of 1-butene and 1-hexene are preferred. The α-olefins need not be linear. They may be branched. Representative of such nonconjugated dienes are 1,4-pentadiene, 1,4-hexadiene, 1,5-hexadiene, 2-methyl-1,5-hexadiene, 4-methyl-1,4-hexadiene, 5-methyl-1,4-hexadiene, 3,3-dimethyl-1,5-hexadiene, 1,7-octadiene, 1,9-decadiene, 1,19-eicosadiene, 5-vinylnorbornene, 5-ethylidene norbornene, 5-(3-butenyl)-norbornene and the like; 5-methyl-1,4-hexadiene is preferred. It may be used in conjunction with 4-methyl-1,4-hexadiene which is usually produced along with the 5-methyl isomer in the methods for synthesizing the 5-methyl isomer.

In the description of this invention, EPDM means an ethylene-propylene-diene rubber containing from about 20 to 75 weight percent ethylene, from about 80 to 25 weight percent propylene, and a minor proportion of from about 1 to 15 weight percent of $C_5$–$C_{30}$ nonconjugated diene. Typical examples of EPDM are rubbery terpolymers of ethylene, propylene and a suitable diene such as 1,4-hexadiene, dicyclopentadiene, ethylidene norbornene, or methylene norbornene.

In the description of this invention SBR means an emulsion copolymer of styrene and butadiene containing less than 50, and typically about 2 to about 30 percent by weight of styrene. Solution SBR means random copolymers of styrene and butadiene prepared with lithium or alkyllithium catalysts and containing less than 50, and typically about 2 to about 30 percent by weight of styrene.

High cis-1,4-polyisoprene means a homopolymer of isoprene containing more than 70 percent cis-1,4 structure.

High cis-1,4-polybutadiene means a homopolymer of butadiene containing more than 70 percent cis-1,4 structure.

Polyalkenylenes mean homopolymers of cyclomonoolefins, homopolymers of nonconjugated cyclopolyolefins, and interpolymers of cyclomonoolefins with nonconjugated cyclopolyolefins. Examples are: polypentenylene which is a homopolymer of cyclopentene having about 5–99 percent cis and 95–1 percent trans configurations of double bonds; polyoctenylene which is a homopolymer of cyclooctene having about 25–95 percent cis and 75–5 percent trans configurations of double bonds; polyoctadienylene which is a homopolymer of 1,5-cyclooctadiene having about 25–85 percent cis and 75–15 percent trans configurations of double bonds; copolymers of cyclopentene and dicyclopentadiene containing 10–40 mole percent dicyclopentadiene; and copolymers of cyclooctene and 1,5-cyclooctadiene containing 10–50 mole percent of the cyclooctadiene.

The term "phr" means parts per hundred of total rubber, by weight.

Typical examples of high unsaturation diene rubbers are natural rubber, high cis-1,4-polyisoprene, high cis-1,4-polybutadiene, 1,3-butadiene-styrene copolymers (SBR) and polyalkenylenes.

All the elastomers required in the practice of our invention are readily prepared by means of catalysts known to the art.

Inherent viscosity values for the polymers were obtained at 30° C. on 0.05–0.1 percent (w/v) solutions in toluene and are expressed in units of deciliters per gram (dl/g).

In practice, for the instance where it is desired to utilize the elastomeric composition of this invention without the described α-olefin rubbery interpolymer (B), it is particularly desired that the elastomeric composition be comprised of (A) about 25 to about 35 phr of the rubbery EPDM, (C) about 65 to about 75 phr of the high unsaturation rubber which is comprised of about 30 to about 80 weight percent natural rubber, and (D) about 0.5 to about 10 phr of the compound additive.

The practice of this invention is further illustrated by reference to the following examples which are intended to be representative rather than restrictive of the scope of the invention. Unless otherwise indicated, all parts and percentages are by weight.

EXAMPLE I

A. Test Sample Preparation

Samples of several rubber blend compositions for use in the tire sidewalls were prepared and examined for their peel adhesion to a representative pneumatic rubber tire carcass. Such rubber blend compositions were prepared by mixing the rubbers in a Banbury with carbon black and other ingredients as specified in Table 1. Sulfur and accelerators were then milled into the black stocks. The resulting compositions were sheeted out and a 6×6 inches sample (60 grams) cut out for use in the fabrication of a peel test block 6×6×0.25 inches.

The peel test block consisted of a layer of the above described blend composition stock resting against a layer of carcass stock and separated at one end by a 1½ inch wide strip of heavy aluminum foil. These two stocks were sandwiched between outer layers of nylon cord backing. The test block was cured for 18 minutes at 300° F. Test samples 1 inch wide, were cut out from the peel test block. The ends of the test sample separated by the aluminum foil, were placed in the jaws of an Instron machine for the peel test. After conditioning for 10 minutes at 200° F., the ends were pulled (2 inch/min.) at a 90° angle to the test piece and adhesion values recorded. Two samples of each composition were tested. A typical carcass rubber composition used for adhesion testing is shown in Table 2.

TABLE 1

| Banbury Mix | COMPOUNDING RECIPE Parts |
|---|---|
| Rubbers | 100 |
| FEF Carbon Black | 25 |
| Stearic Acid | 2 |
| Zinc Oxide | 3 |
| Antiozonant | 0.75 |
| Antioxidant | 0.75 |
| Mill Mix | |
| Sulfur | 1.5 |
| Accelerators | 0.9 |
| Additive Compound | 0 to 4 |

TABLE 2

| Compound | Parts |
|---|---|
| Natural Rubber (Brown Crepe No. 2) | 100 |
| Process Oil | 5 |
| Tackifying Resins | 7.5 |
| Stearic Acid | 2 |
| Antioxidant (phenolic) | 1 |
| Carbon Black | 30 |
| Sulfur | 2.75 |
| Zinc Oxide | 3 |
| Accelerator | 1.55 |

B. Results

The effect of triallyl cyanurate (TAC) concentration on the peel adhesion (200° F.) of three rubber blend compositions to tire carcass stock is dramatically shown in Table 3. The TAC additive was added on the mill with the sulfur and accelerators. The rubbers used are given in Table 4. The 35 NR/35SBR1502/30 "Royalene 301T" EPDM blend (No. 1) shows an increase in adhesion from about 19 lb/inch to 26 lbs/inch as the concentration of TAC is increased to 2 phr. The adhesion values remain essentially unchanged as the TAC is increased from 2 to 4 phr. The 35 NR/35SBR/30 Hexene copolymer A blend (No. 2) shows a negligible decrease in adhesion value as the TAC is increased up to 4 phr. However, when the EPDM ("Royalene 301T") is partially replaced with the hexene copolymer A (blend No. 3), the adhesion values are unexpectedly high when the TAC concentration is between 0 and 2 phr. In particular, the adhesion values of about 30 lbs/inch obtained at 0.5 and 1 phr of TAC are significantly higher than the corresponding values for the 35 NR/35 SBR/30 EPDM blend (No. 1).

TABLE 3

Peel Adhesion vs Triallyl Cyanurate[1] Concentration in Blend

| Blend[a] | Triallyl Cyanurate, phr | | | | |
|---|---|---|---|---|---|
| | 0 | 0.5 | 1.0 | 2.0 | 4.0 |
| No. 1 | 19 | 22 | 22 | 26 | 26 |
| No. 2 | 5 | 4 | 4 | 4 | 3 |
| No. 3 | 18 | 30 | 30 | 26 | 12 |

[1]The values in the table for peel adhesion are lb/inch at 200° F.
[a]Blend No. 1 is a mix of 35 parts natural rubber (NR)/35 parts SBR 1502/30 parts "Royalene 301T" EPDM;
Blend No. 2 is a mix of 35 NR/35SBR 1502/30 hexene copolymer A;
Blend No. 3 is a mix of 35 NR/35 SBR 1502/15 EPDM/15 hexene copolymer A.

TABLE 4

A. Copolymers of 1-hexene with methyl hexadiene[a]

| Copolymer | Molar Ratio[b] | Inherent Viscosity, dl/g |
|---|---|---|
| A | 90:10 | 2.8 |
| B | 90:10 | 3.0 |
| C | 90:10 | 5.2 |
| D | 90:10 | 6.9 |
| E | 90:10 | 5.2 |

B. EPDM and Diene Rubbers

| | |
|---|---|
| EPDM | "Royalene 301T"-TM-Uniroyal ethylene/propylene/dicyclopentadiene terpolymer |
| | "Nordel 1470"-TM-duPont ethylene/propylene/1,4-hexadiene terpolymer |
| natural rubber | No. 1 smoked sheet (NR) |
| SBR 1502 | styrene/butadiene emulsion copolymer, 23.5 percent styrene |
| "Solprene 1204" | styrene/butadiene solution copolymer, 25 percent styrene, TM-Phillips Petroleum |
| Polypentenylene | Cyclopentene polymer, inherent viscosity 2.8 |

[a]60:40 mixture of 4- and 5-methyl-1,4-hexadienes.
[b]molar charge ratio of 1-hexene to methyl hexadienes.

EXAMPLE II

The data in Table 5 show the effect of triallyl cyanurate (TAC) on the peel adhesion (200° F.) of several rubber blend compositions to tire carcass stock. These rubber blend compositions were prepared and tested as described in Example I. The rubbers used are given in Table 4. The addition of triallyl cyanurate to the blend compositions produces higher adhesion except for the blend containing 70 phr natural rubber which shows a loss of adhesion.

TABLE 5

PEEL ADHESION TO TIRE CARCASS STOCK OF RUBBER BLEND COMPOSITIONS CONTAINING TRIALLYL CYANURATE (TAC)

| NR | SBR 1502 | "Royalene 301T" | Hexene Copolymer D | Adhesion, lbs/inch TAC, phr | |
|---|---|---|---|---|---|
| | | | | 0 | 2 |
| 70 | 0 | 30 | 0 | 10 | 7 |
| 70 | 0 | 15 | 15 | 21 | 14 |
| 45 | 25 | 30 | 0 | 15 | 20 |
| 45 | 25 | 15 | 15 | 14 | 18 |
| 25 | 45 | 30 | 0 | 16 | 21 |
| 25 | 45 | 15 | 15 | 10 | 16 |
| 0 | 70 | 30 | 0 | 6 | 13 |
| 0 | 70 | 15 | 15 | 7 | 12 |

EXAMPLE III

The data in Table 6 show the effect of triallyl cyanurate (TAC) on the peel adhesion (200° F.) of several rubber blend compositions to tire carcass stock. These rubber compositions were prepared and tested as described in Example I. The rubbers used are given in Table 4. In Series A adhesion data are shown for blends containing "Nordel 1470" EPDM as a replacement for "Royalene 301T" and Series B polypentenylene as a replacement for emulsion SBR 1502. The addition of 2 phr TAC provides substantial adhesion improvement in all blends.

TABLE 6

PEEL ADHESION TO TIRE CARCASS STOCK OF RUBBER BLEND COMPOSITIONS CONTAINING TRIALLYL CYANURATE (TAC)

| Series | NR | SBR 1502 | "Nordel 1470" | Hexene Copolymer E | Adhesion, lbs/inch TAC, phr | |
|---|---|---|---|---|---|---|
| | | | | | 0 | 2 |
| A | 35 | 35 | 30 | 0 | 20 | 32 |
| | 35 | 35 | 15 | 15 | 20 | 34 |
| | | Poly Pen- | "Royalene | Hexene | | |

TABLE 6-continued

PEEL ADHESION TO
TIRE CARCASS STOCK OF
RUBBER BLEND COMPOSITIONS
CONTAINING TRIALLYL CYANURATE (TAC)

| | NR | Ienylene | 301T" | Copolymer D | | |
|---|---|---|---|---|---|---|
| B | 35 | 35 | 30 | 0 | 13 | 28 |
| | 35 | 35 | 25 | 5 | 21 | 28 |
| | 35 | 35 | 15 | 15 | 17 | 26 |

EXAMPLE IV

The data in Table 7 show the effect of N,N'-m-phenylenebismaleimide (MPBM) on the peel adhesion (200° F) of several rubber blend compositions to tire carcass stock. These rubber compositions were prepared and tested as described in Example I. The rubbers used in these blend compositions are given in Table 4. In Series A the adhesion of all blends is improved by the addition of MPBM. The highest adhesion values were obtained in the blends containing 10 and 15 phr of hexene copolymer B as a partial replacement for EPDM ("Royalene 301T"). In Series B adhesion data are shown for blends containing "Nordel 1470" EPDM as a replacement for "Royalene 301T" and polypentenylene as a replacement for solution SBR ("Solprene 1204") and emulsion SBR 1502. The addition of 2 phr MPBM provides substantial adhesion improvement in all blends.

EXAMPLE V

The data in Table 8 show the effect of maleimide and phenyl maleimide on the peel adhesion (200° F.) of several rubber blend compositions to tire carcass stock. The rubber compositions were prepared and tested as described in Example I. The rubbers used are given in Table 4. In series A, the adhesion of the blend containing 30phr "Royalene 301T" is reduced by the addition of 2 phr phenyl meleimide, whereas the adhesion of the blend containing 10 phr of Hexene Copolymer B as a partial replacement for EPDM is sharply increased. In Series B, the adhesion of both blends is increased by the addition of 2 phr maleimide.

TABLE 8

PEEL ADHESION TO
TIRE CARCASS STOCK OF
RUBBER BLEND COMPOSITIONS
CONTAINING MALEIMIDE COMPOUNDS

| Series | NR | SBR 1502 | "Royalene 301T" | Hexene Copolymer B | Adhesion, lb/inch Maleimide, phr | |
|---|---|---|---|---|---|---|
| | | | | | 0 | 2 |
| A | 35 | 35 | 30 | 0 | 21 | 15 |
| | 35 | 35 | 20 | 10 | 25 | 45 |
| B | 35 | 35 | 30 | 0 | 20 | 37 |
| | 35 | 35 | 15 | 15 | 19 | 42 |

EXAMPLE VI

The data in Table 9 show the effect of several anhydride additives on the peel adhesion (200° F.) of two rubber blend compositions — 35NR/35SBR/30EPDM and 35NR/35SBR/15EPDM/15Hexene Copolymer E — to tire carcass stock. In Series A, the data show that

TABLE 7

PEEL ADHESION TO
TIRE CARCASS STOCK OF
RUBBER BLEND COMPOSITIONS
CONTAINING N,N'-m-Phenylenebismaleimide (MPBM)

| Series | NR | SBR 1502 | "Royalene 301T" | Hexene Copolymer B | Adhesion, lbs/inch MPBM, phr | | |
|---|---|---|---|---|---|---|---|
| | | | | | 0 | 0.5 | 2.0 |
| A | 35 | 35 | 30 | 0 | 21 | 22 | 37 |
| | 35 | 35 | 20 | 10 | 25 | 43 | 49 |
| | 35 | 35 | 15 | 15 | 21 | 42 | 52 |
| | 35 | 35 | 10 | 20 | 5 | 20 | 30 |
| | 35 | 35 | 0 | 30 | 9 | 13 | 11 |
| | | SBR 1502 | "Nordel 1470" | Hexene Copolymer C | | | |
| B | 35 | 35 | 30 | 0 | 20 | — | 29 |
| | 35 | 35 | 15 | 15 | 20 | — | 64 |
| | | "Solprene 1204" | "Royalene 301T" | Hexene Copolymer D | | | |
| | 35 | 35 | 30 | 0 | 20 | — | 27 |
| | 35 | 35 | 15 | 15 | 15 | — | 47 |
| | | Poly-Pentenylene | "Royalene 301T" | Hexene Copolymer D | | | |
| | 35 | 35 | 30 | 0 | 13 | — | 58 |
| | 35 | 35 | 25 | 5 | 21 | — | 61 |
| | 35 | 35 | 15 | 15 | 17 | — | 51 | the addition of 2 phr isatoic anhydride (IA), N-methylisatoic anhydride (N-CH₃IA), or maleic anhydride (MA) sharply increases the adhesion values of both blends. In Series B, 1 phr of phthalic anhydride (PA) also sharply increases the adhesion of both blends to tire carcass stock.

TABLE 9

EFFECT OF ANHYDRIDE ADDITIVES ON THE PEEL ADHESION OF BLEND TO CARCASS

| Series | SBR NR | lene 1502 | "Roya-Copoly-301T" | Hexene tive* mer E | Addi-lbs/inch phr | Adhesion 0 | 1.0 | 2.0 |
|---|---|---|---|---|---|---|---|---|
| A | 35 | 35 | 30 | 0 | IA | 14 | — | 56 |
|   | 35 | 35 | 30 | 0 | N-CH₃IA | 14 | — | 50 |
|   | 35 | 35 | 30 | 0 | MA | 14 | — | 46 |
|   | 35 | 35 | 15 | 15 | IA | 12 | — | 39 |
|   | 35 | 35 | 15 | 15 | N-CH₃IA | 12 | — | 34 |
|   | 35 | 35 | 15 | 15 | MA | 12 | — | 62 |
| B | 35 | 35 | 30 | 0 | PA | 20 | 62 | — |
|   | 35 | 35 | 15 | 15 | PA | 25 | 64 | — |

*Isatoic anhydride (IA), N-methylisatoic anhydride (N-CH₃IA), maleic anhydride (MA), phthalic anhydride, (PA).

The foregoing examples show the usefulness of the blend compositions of this invention for tire sidewalls. However, these blend compositions may also be used for fabricating other rubbery goods such as, for example, dock fenders, conveyor belts, hose and the like.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire which comprises a generally toroidal shaped carcass with a circumferential tread, shaped beads and connecting sidewall portions extending between said tread and beads and having adhered to said sidewall portion an adherent, covulcanized outer rubbery sidewall layer extending from the general area of said bead portion towards said tread, where said rubbery sidwall layer is an elastomeric composition comprised of (A) about 10 to about 40 phr rubbery EPDM, (B) about 0 to about 20 phr of a rubbery polymer prepared from at least one $C_4 - C_{10}$ α-olefin interpolymerized with at least one $C_5 - C_{30}$ nonconjugated polyene containing 2 or more carbon to carbon double bonds, (C) about 55 to about 80 phr of high unsaturation rubbers comprised of 30 to 80 weight percent natural rubber and (D) about 0.5 to about 10 phr of at least one compound additive selected from the group consisting of triallyl cyanurate, mono-and bis-maleimides selected from maleimide, N-ethylmaleimide, N-phenylmaleimide, N-trichloromethylmaleimide, N-4-carboxyphenylmaleimide, N,N'-thiobismaleimide, N,N'-dithiobismaleimide, and N,N'-phenylenebismaleimide, and anhydrides selected from isatoic anhydride, N-methyl isatoic anhydride, phthalic anhydride, succinic anhydride and maleic anhydride.

2. The pneumatic tire of claim 1 where said sidewall layer is comprised of (A) about 25 to about 35 phr of said EPDM, (C) about 65 to about 75 phr of said high unsaturation rubbers and (D) about 0.5 to about 10 phr of said compound additives.

3. The pneumatic tire of claim 1 where said sidewall layer, is comprised of (A) about 10 to about 40 phr of said EPDM, (B) about 5 to about 15 phr of said α-olefin interpolymers, (C) about 60 to about 80 phr high unsaturation rubbers and (D) about 0.5 to about 10 phr of said compound additives.

4. The pneumatic tire of claim 1 wherein, in said outer rubbery sidewall layer, said EPDM is an ethylene propylene-diene rubber containing from about 20 to 75 weight percent ethylene, from about 80 to 25 weight percent propylene, and a minor proportion of from 1 to about 15 weight percent of a nonconjugated diene selected from at least one 1,4-hexadiene, dicyclopentadiene, ethylidene norbornene, and methylene norbornene, where said rubbery α-olefin interpolymer is the interpolymerization product of a monomer mixture comprised of about 70 to about 98 weight percent of at least one $C_4 - C_{10}$ α-olefin and correspondingly about 30 to about 2 weight percent of at least one $C_5 - C_{30}$ nonconjugated polyene containing from 2 to 8 carbon to carbon double bonds in the presence of a coordination or Ziegler-type catalyst, and where said high unsaturation rubber is natural high cis-1,4-polyisoprene rubber and at least one rubber selected from high cis-1,4-polyisoprene, high cis-1,4-polybutadiene, emulsion-derived butadiene/styrene rubber, solution-derived butadiene/styrene rubber and polyalkenylenes, where said polyalkenylenes are selected from polypentenylene which is homopolymer of cyclopentene having about 5–99 percent cis and 95–1 percent trans configurations of double bonds, polyoctenylene which is a homopolymer of cyclooctene having about 25–95 percent cis and 75–5 percent trans configurations of double bonds, polyoctadienylene which is a homopolymer of 1,5-cyclooctadiene having about 25–85 percent cis and 75–15 percent trans configurations of double bonds, copolymers of cyclopentene and dicyclopentadiene containing 10–40 mole percent dicyclopentadiene, and copolymers of cyclooctene and 1,5-cyclooctadiene containing 10–50 mole percent of the cyclooctadiene.

5. The pneumatic tire of claim 3 wherein, in said outer sidewall layer, said rubbery α-olefin interpolymer has an inherent viscosity of about 1 to about 10 dl/g as determined in toluene at 30° C. and is prepared by the interpolymerization of at least one α-olefin selected from 1-butene, 1-pentene, 1-hexene, 1-octene, and 1-decene and at least one nonconjugated diene selected from 1,4-hexadiene, 1,5-hexadiene, 4-methyl-1,4-hexadiene, 5-methyl-1,4-hexadiene, 3,3-dimethyl-1,5-hexadiene, 1,7-octadiene, 1,9-decadiene and 1,19-eicosadiene.

6. The pneumatic tire of claim 4 where said α-olefin interpolymer is prepared by the interpolymerization of 1-butene, 1-hexene and a mixture of 4-methyl-1,4-hexadiene and 5-methyl-1,4-hexadiene.

7. The pneumatic tire of claim 4 where said high unsaturation rubber is comprised of natural high cis-1,4-polyisoprene rubber and synthetic butadiene/styrene rubber.

8. The pneumatic tire of claim 1 where said compound additive is triallyl cyanurate.

9. The pneumatic tire of claim 1 where said compound additive is selected from mono-and bis-maleimides selected from maleimide, N-phenylmaleimide, and N,N'-phenylenebismaleimide.

10. The pneumatic rubber tire of claim 1 where said compound additive is an anhydride selected from isatoic anhydride, N-methylisatoic anhydride, phthalic anhydride and maleic anhydride.

11. The elastomeric composition suitable for the rubbery sidewall layer of the pneumatic rubber tire of claim 1 which comprises (A) about 10 to about 40 phr rubbery EPDM, (B) about 0 to about 20 phr of a rubbery polymer prepared from at least one $C_4 - C_{10}$ α-olefin interpolymerized with at least one $C_5 - C_{30}$ nonconjugated polyene containing 2 or more carbon to carbon double bonds, (C) about 55 to about 80 phr of high unsaturation rubbers comprised of 30 to 80 weight percent natural rubber and (D) about 0.5 to about 10 phr of at least one compound additive selected from the group consisting of triallyl cyanurate, mono and bis maleimides selected from maleimide, N-ethylmaleimide, N-phenylmaleimide, N-trichloromethylmaleimide, N-4-carboxyphenylmaleimide, N,N'-thiobismaleimide, N,N'-dithiobismaleimide, and N,N'-phenylenebismaleimide, and anhydrides selected from isatoic anhydride, N-methyl isatoic anhydride, phthalic anhydride, succinic anhydride and maleic anhydride.

12. The elastomeric composition of claim 11 where said EPDM is an ethylene propylene-diene rubber containing from about 20 to 75 weight percent ethylene, from about 80 to 25 weight percent propylene, and a minor proportion of from 1 to about 15 weight percent of a non-conjugated diene selected from at least one of 1,4-hexadiene, dicyclopentadiene, ethylidene norbornene, and methylene norbornene, where said rubbery α-olefin interpolymer is the interpolymerization product of a monomer mixture comprised of about 70 to about 98 weight percent of at least one $C_4 - C_{10}$ α-olefin and correspondingly about 30 to about 2 weight percent of at least one $C_5 - C_{30}$ nonconjugated polyene containing from 2 to 8 carbon to carbon double bonds in the presence of a coordination or Ziegler-type catalyst, and where said high unsaturation rubber is natural high cis-1,4-polyisoprene rubber and at least one rubber selected from high cis-1,4-polyisoprene, high cis-1,4-polybutadiene, emulsion-derived butadiene/styrene rubber, solution-derived butadiene/styrene rubber and polyalkenylenes, where said polyalkenylenes are selected from polypentenylene which is a homopolymer of cyclopentene having about 5–99 percent cis and 95–1 percent trans configurations of double bonds, polyoctenylene which is a homopolymer of cylooctene having about 25–95 percent cis and 75–5 percent trans configurations of double bonds, polyoctadienylene which is a homopolymer of 1,5-cyclooctadiene having about 25–85 percent cis and 75–15 percent trans configurations of double bonds, copolymers of cyclopentene and dicyclopentadiene containing 10–40 mole percent dicyclopentadiene, and copolymers of cyclooctene and 1,5 -cyclooctadiene containing 10–50 mole percent of the cylooctadiene.

13. The elastomeric composition of claim 12 where said rubbery α-olefin interpolymer has an inherent viscosity of about 1 to about 10 dl/g as determined in toluene at 30° C. and is prepared by the interpolymerization of at least one α-olefin selected from 1-butene, 1-pentene, 1-hexene, 1-octene, and 1-decene and at least one nonconjugated diene selected from 1,4-hexadiene, 1,5-hexadiene, 4-methyl-1,4-hexadiene, 5-methyl-1,4-hexadiene, 3,3-dimethyl-1,5-hexadiene, 1,7-octadiene, 1,9-decadiene and 1,19-eicosadiene.

14. The elastomeric composition of claim 13 where said α-olefin interpolymer is prepared by the interpolymerization of 1-butene, 1-hexene and a mixture of 4-methyl-1,4-hexadiene and 5-methyl-1,4-hexadiene.

15. The elastomeric composition of claim 13 where said high unsaturation rubber is comprised of natural high cis-1,4-polyisoprene rubber and synthetic butadiene/styrene rubber.

16. The elastomeric composition of claim 11 where said compound additive is triallyl cyanurate.

17. The elastomeric composition of claim 11 where said compound additive is selected from mono-and bis-maleimides selected from maleimide, N-phenylmaleimide, and N,N'-phenylenebismaleimide.

18. The elastomeric composition of claim 11 where said compound additive is an anhydride selected from isatoic anhydride, N-methylisatoic anhydride, phthalic anhydride and maleic anhydride.

19. The elastomeric composition of claim 1 which comprises (A) about 10 to about 40 phr rubbery EPDM, (B) about 0 to about 20 phr of a rubbery polymer prepared from at least one $C_4 - C_{10}$ α-olefin interpolymerized with at least one $C_5 - C_{30}$ nonconjugated polyene containing 2 or more carbon to carbon double bonds, (C) about 55 to about 80 phr of high unsaturation rubbers comprised of 30 to 80 weight percent natural rubber and (D) about 0.5 to about 10 phr of at least one compound additive selected from the group consisting of triallyl cyanurate, mono- and bis-maleimides selected from maleimide, N-ethylmaleimide, N-phenylmaleimide, N-trichloromethylmaleimide, N-4-carboxyphenylmaleimide, N,N'-thiobismaleimide, N,N'-dithiobismaleimide, and N,N'-phenylenebismaleimide, and anhydrides selected from isatoic anhydride, N-methyl isatoic anhydride, phthalic anhydride, succinic anhydride and maleic anhydride.

20. The pneumatic tire of claim 4 where said α-olefin interpolymer is prepared by the interpolymerization of 1-hexene and a mixture of 4-methyl-1,4-hexadiene and 5-methyl-1,4-hexadiene.

* * * * *